(12) United States Patent
Cheben et al.

(10) Patent No.: US 7,317,535 B2
(45) Date of Patent: Jan. 8, 2008

(54) WAVELENGTH DISPERSIVE FOURIER TRANSFORM SPECTROMETER

(75) Inventors: Pavel Cheben, Ottawa (CA); Ian Powell, Ottawa (CA); Siegfried Janz, Gloucester (CA); Dan-Xia Xu, Gloucester (CA)

(73) Assignee: National Research Council of Canada, Ottawa, Ontario (CA)

( * ) Notice: Subject to any disclaimer, the term of this patent is extended or adjusted under 35 U.S.C. 154(b) by 138 days.

(21) Appl. No.: 11/221,925

(22) Filed: Sep. 9, 2005

(65) Prior Publication Data

US 2006/0055935 A1 Mar. 16, 2006

Related U.S. Application Data

(60) Provisional application No. 60/608,369, filed on Sep. 10, 2004.

(51) Int. Cl.
*G01B 9/02* (2006.01)
(52) U.S. Cl. .................. 356/451; 356/326
(58) Field of Classification Search ........ 356/326, 356/451; 250/339.07, 339.08
See application file for complete search history.

(56) References Cited

U.S. PATENT DOCUMENTS

| 5,059,027 A | 10/1991 | Roesler et al. |
| 5,777,736 A | 7/1998 | Horton |
| 5,982,497 A * | 11/1999 | Hopkins .............. 356/419 |
| 6,590,668 B1 * | 7/2003 | Huber et al. .......... 356/520 |
| 6,687,007 B1 | 2/2004 | Meigs |

OTHER PUBLICATIONS

Harlander et al., in Applied Optics, vol. 41, pp. 1343-1352, 2002.

* cited by examiner

*Primary Examiner*—Samuel A. Turner
(74) *Attorney, Agent, or Firm*—Anne Kinsman; Borden Ladner Gervais LLP

(57) ABSTRACT

A spectroscopic method and system for the spectral analysis of an optical signal directed to a wavelength dispersive component having two interleaved dispersive devices. For a single wavelength, the optical signal exiting the interleaved dispersive devices includes two wavefronts generally disposed at an angle to one another and producing an interference pattern. The interference pattern is detected and subsequently analyzed via a Fourier transform to produce the optical spectrum of the input beam. The method and system are applicable in a planar waveguide environment, in reflection and transmission geometries.

22 Claims, 15 Drawing Sheets

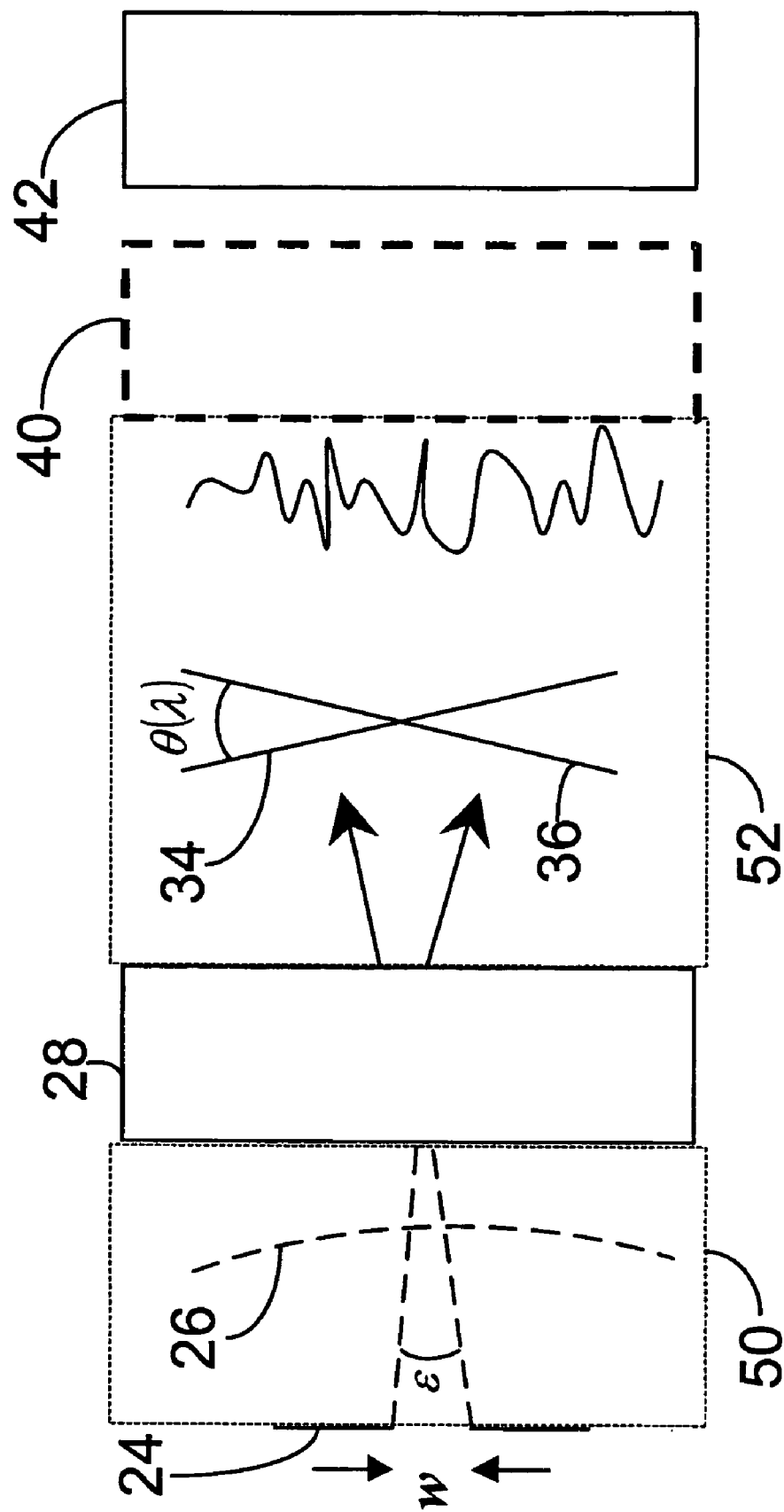

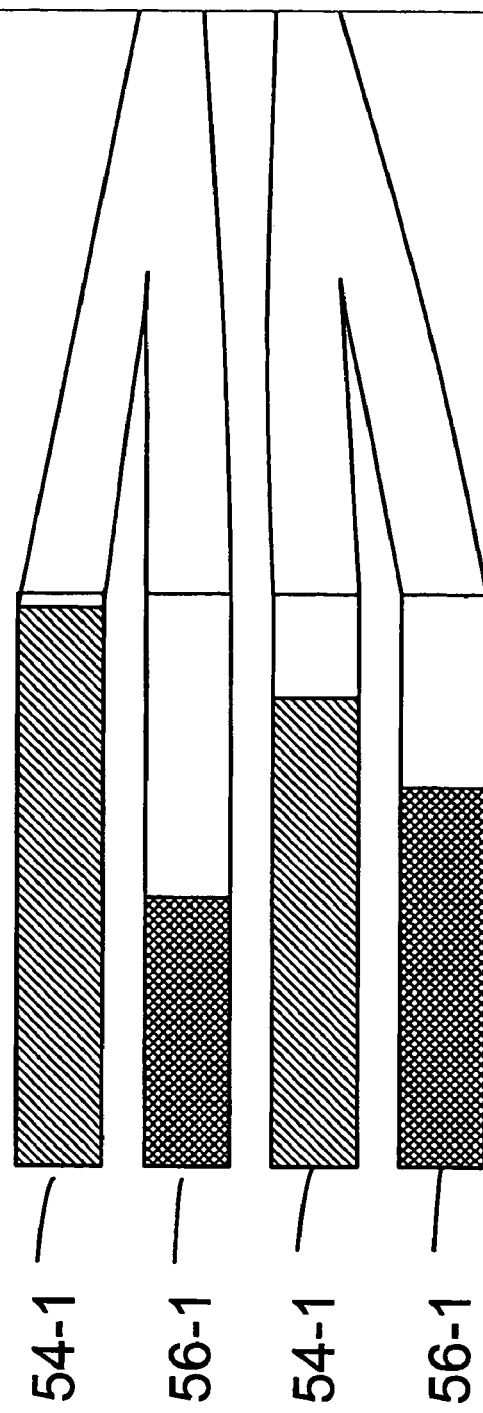

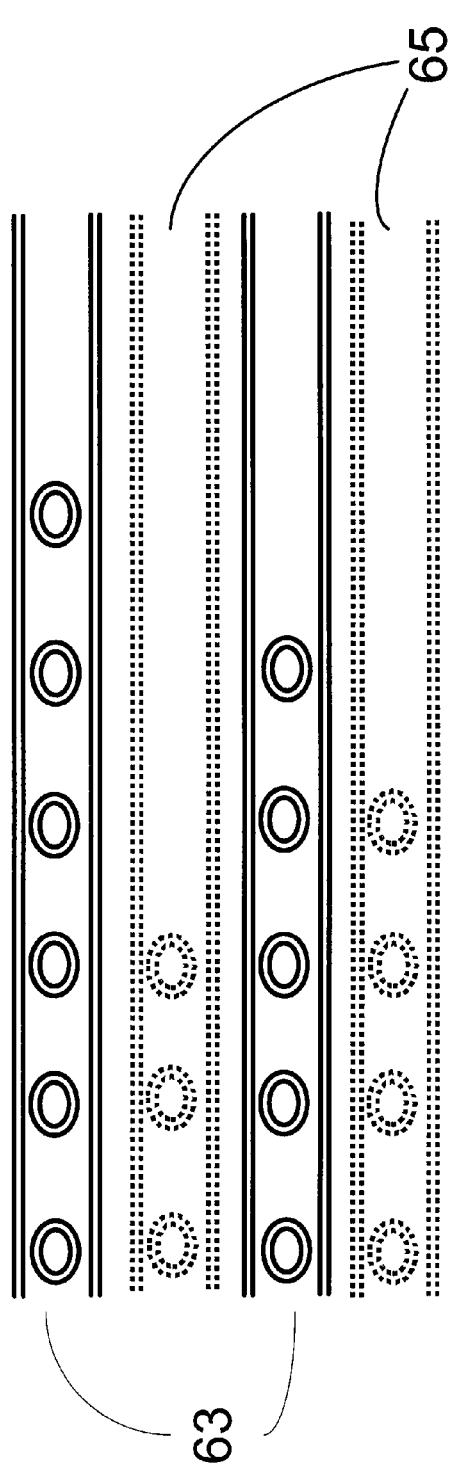
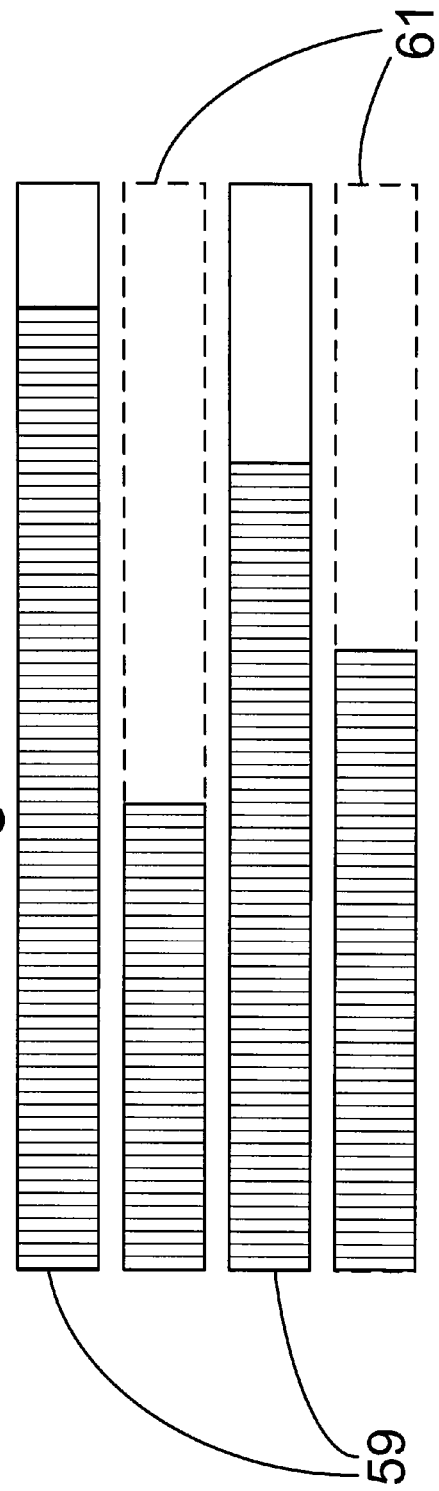
Fig. 3e
Fig. 3d

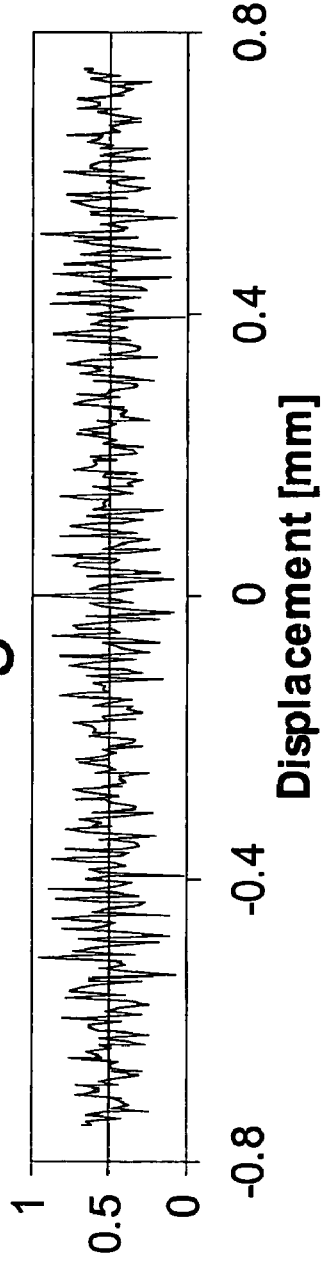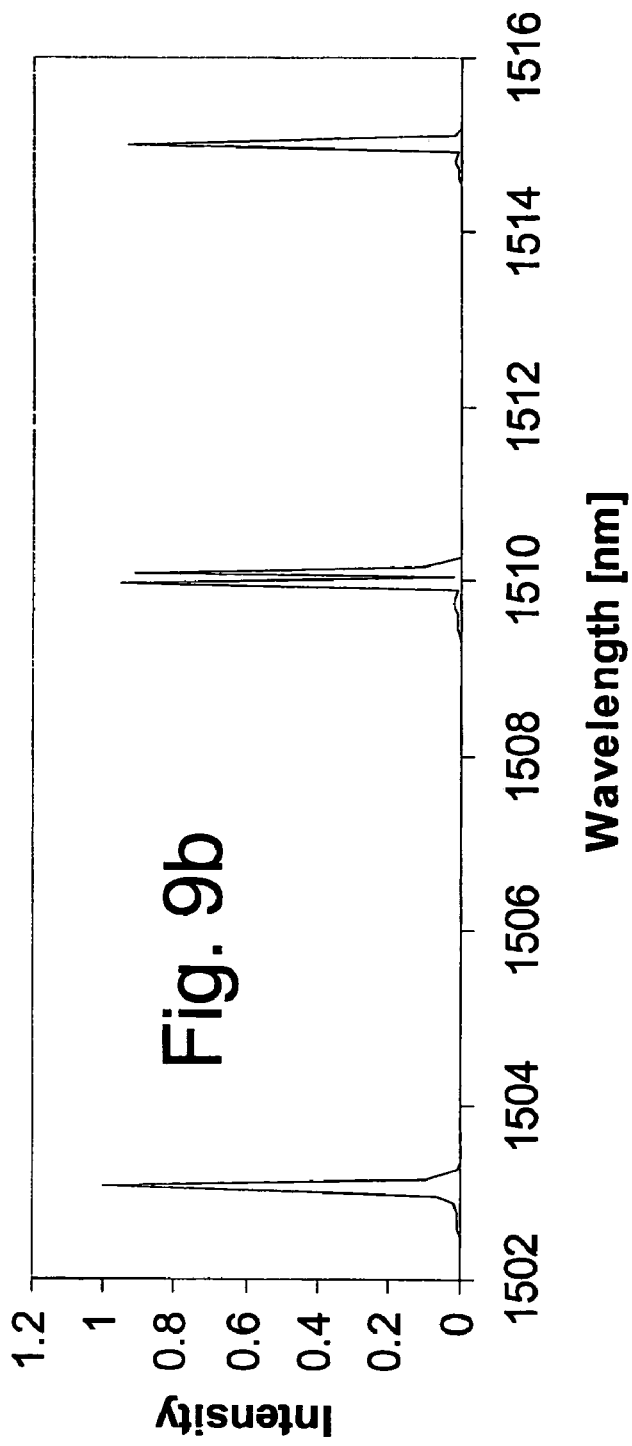

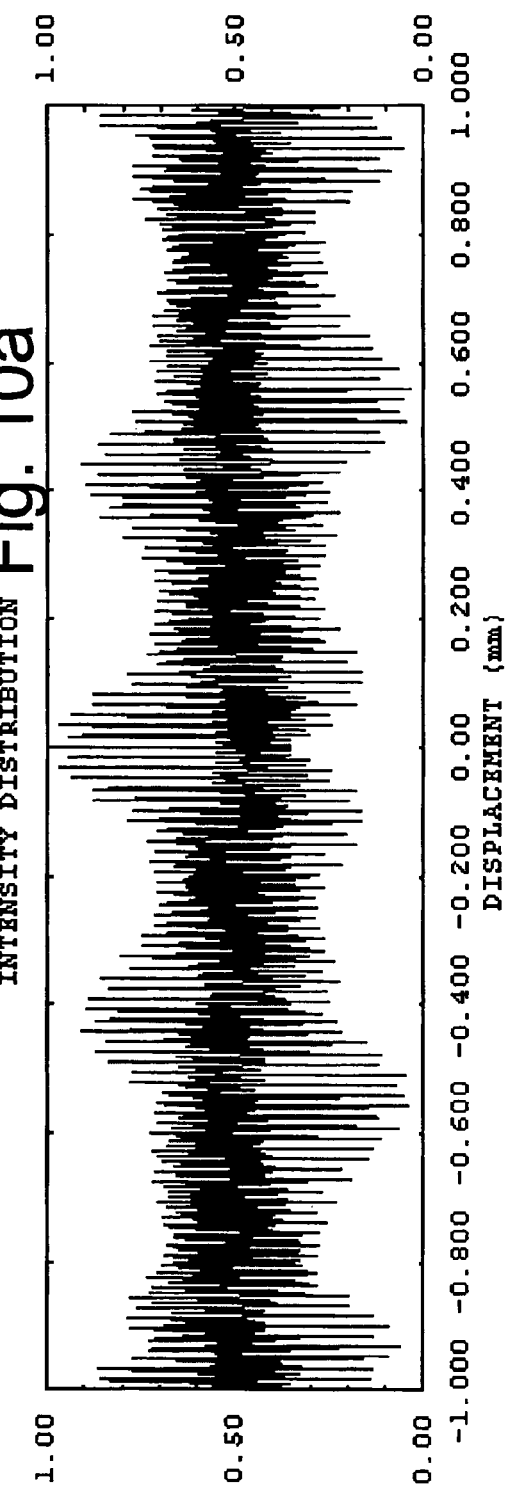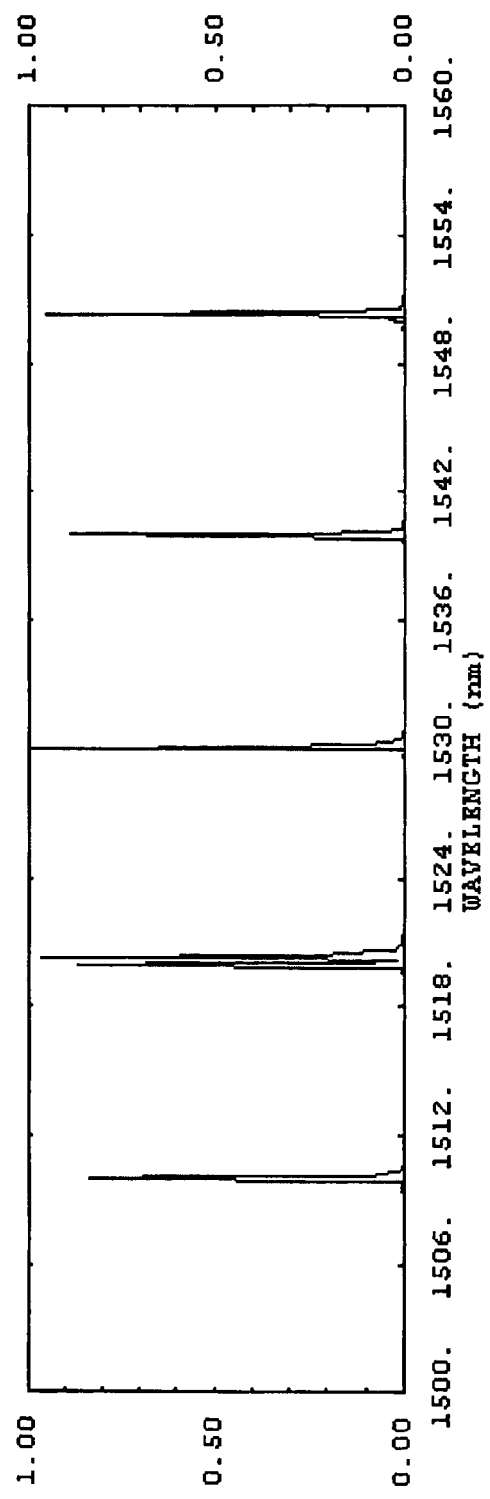

WAVELENGTH DISPERSIVE FOURIER TRANSFORM SPECTROMETER

CROSS REFERENCE TO RELATED APPLICATIONS

This application claims the benefit of U.S. Provisional Application No. 60/608,369, filed Sep. 10, 2004, which is incorporated herein by reference.

FIELD OF THE INVENTION

The present invention relates generally to spectrometers. More particularly, the present invention relates to wavelength-dispersive Fourier transform spectrometers.

BACKGROUND OF THE INVENTION

Recent trends in the telecommunication industry have been towards optical wavelength multiplexing for increasing bandwidth, and towards miniaturization of components and modules for higher integration. The particular case of spectrometers, including micro-spectrometers, in this and other industries has not escaped these tendencies.

In spectroscopy applications in general, i.e. in applications where wavelength separation and/or combination are required, several types of spectrometers are available. They include grating-based spectrometers, scanning Fourier transform spectrometer, and dispersive Fourier transform spectrometers.

An example of a grating-based spectrometer is that of the USB2000 model manufactured by Ocean Optics Inc. of Dunedin, Fla. It uses standard bulk optics, including a bulk grating, mounted in a relatively small package that can interface with a computer. More advanced micro-spectrometers using gratings include those with gratings formed by a LIGA process (x-ray lithography and micro-electroplating), such a micro-spectrometer being described by P. Krippner et al. in Proc. SPIE Vol. 2783, pp. 277-282, 1996. These grating-based spectrometers require taxing fabrication processes (LIGA process) and/or precise assembly of several bulk optics components such as gratings, mirrors, lenses and beamsplitters/combiners. Further, increasing the resolution of this type of grating-based spectrometers typically involves reducing the width of the entrance aperture (and the width of the exit aperture when present) or, more generally, increasing the F/# of the spectrometer. This leads to a reduction of light gathering efficiency, also known as étendue, which in turn yields higher acquisition time and/or spectra with a relatively low signal to noise ratio.

On the other hand, scanning Fourier transform spectrometers usually have large étendue and provide high resolution spectra. However, such benefits come at the cost of having one or more scanning elements, i.e. moving parts, which is an undesirable feature in applications where ease of manufacturing, ruggedness and low maintenance are desirable. Additionally, sufficient scanning amplitude of the scanning elements is required to obtain good spectral resolution. An example of a scanning Fourier transform spectrometer is given by O. Manzardo et al. in Optics Letters, Vol. 29, No. 13, Pp. 1437-1439, 2004. There, a micro-electro-mechanical system (MEMS) is used to form a miniature lamellar grating interferometer. However, the limited displacement amplitude of the moving elements (approximately 100 µm) fails to provide good spectral resolution.

Wavelength dispersive Fourier transform spectrometers have been disclosed in, for example, U.S. Pat. No. 5,059,027 issued Oct. 22, 1991, incorporated herein by reference. There, a collimating means is used to illuminate a diffraction grating-based dispersive two-beam interferometer, which provides, for a given wavelength, two wavefronts at its output, the wavefronts generally being at an angle with each other. The interference pattern formed by the two wavefronts is detected and analyzed to provide the spectral signal of the input light beam.

Harlander et al., in Applied Optics, vol. 41, pp. 1343-1352, 2002 also discloses a wavelength dispersive compact Fourier transform spectrometer, which can have a large spectral resolution. The spectrometers of U.S. Pat. No. 5,059,027 and of Harlander et al. includes collimating optics and a beamsplitter/combiner together with diffraction gratings and prisms. These optical elements involve delicate alignment, increase manufacturing complexity and do not easily lend themselves to miniaturization.

Accordingly, it is noted that diffraction grating-based spectrometers with high resolution have poor étendue. Further, scanning Fourier transform spectrometers commonly include moving parts requiring relatively large displacement amplitude to obtain high spectral resolution. Still further, existing dispersive Fourier transform spectrometers require collimating optics with beamsplitters/combiners, which increase manufacturing complexity. Therefore, it is desirable to provide a spectrometer having large étendue and high resolution while including a minimum number of collimating optics and beamsplitters/combiners, and being free of moving parts. Yet still further, it is also desirable to provide a spectrometer having the above-mentioned characteristics in addition to having a small form factor.

SUMMARY OF THE INVENTION

It is an object of the present invention to obviate or mitigate at least one disadvantage of previous spectrometers, micro-spectrometers, multiplexing/demultiplexing products and other similar devices.

In a first aspect, the present invention provides a spectrometer for analyzing an optical signal. The spectrometer comprises an input port for receiving the optical signal and two interleaved wavelength dispersive devices for receiving the optical signal from the input port and for dispersing the optical signal.

In a further embodiment, there is provided a method of determining the spectrum of an optical signal. The method comprises steps of illuminating two interleaved dispersive devices, detecting a dispersed light signal from the interleaved dispersive devices and analyzing the dispersed light signal. The step of analyzing the dispersed light signal including performing a Fourier transform of the dispersed light signal.

In a further aspect, the present invention provides a spectrometer for analyzing an optical signal. The spectrometer comprises an input port for receiving the optical signal and a multi-facet prism element for receiving the optical signal form the input port. The multi-facet prism element is also for dispersing the optical signal, and for producing a dispersed optical signal having two distinct wavefronts.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2a is a depiction of the embodiment of FIG. 1 further including planar waveguides;

FIG. 3b is a depiction of individual waveguides y-coupled at one end;

FIG. 3d is a depiction of waveguide arrays having prating structures formed therein;

FIG. 3e is a depiction of waveguide arrays having resonators formed therein;

FIGS. 9a and 9b are respectively a simulated interferogram and its corresponding wavelength spectrum; and FIGS. 10a and 10b are respectively a simulated interferogram and its corresponding wavelength spectrum.

DETAILED DESCRIPTION

Generally, the present invention provides a method and a spectrometer for the spectral analysis of an optical signal directed to a twofold wavelength dispersive device. For a single wavelength, the optical signal exiting the twofold dispersive device includes two wavefronts generally at an angle to one another to produce an interference pattern. The interference pattern is detected and subsequently analyzed via a Fourier transform to produce the optical spectrum of the input beam.

Most of the disclosed embodiments of the present invention will be illustrated as being based on optical phased arrays or arrayed waveguide technology, the basic principles of which are presented by M. K. Smit in IEEE Journal of Selected Topics in Quantum Electronics, Vol. 2, No. 2, Pp. 236-250, June 1996. Furthermore, embodiments of the present invention will be illustrated in terms of arrayed waveguide spectrometers preferably formed by a silicon on insulator (SOI) process, as is known in the art and described by, for example, P. Cheben et al. in "Scaling down photonic devices for optical communications: VLSI Circuits and Systems", SPIE Proc. 5117, pp. 147-156, 2003; D.-X. Xu et al., "Prospects and challenges for microphotonic waveguide components based on Si and SiGe", 206th Meeting of the ECS, SiGe: Materials, Processing and Devices, Hawaii, Oct. 2-8, 2004, The Electrochemical Society Proc. vol. 2004-07, 619-633, 2004; W. Bogaerts et al., in "Basic structures for photonic integrated circuits in Silicon-on-insulator", Optics Express 12(8), p. 15831591, 2004; and by G. T. Reed and A. P. Knights in "Silicon Photonics—An Introduction", John Wiley & Sons (2004). However, as will be understood by a skilled worker in the art, processes other than SOI, such as, for example, those using waveguides in glass, silicon nitride, silicon oxynitride, Ill-V semiconductors, polymers, sol-gels, and linear and nonlinear optical crystals, or combinations thereof are also possible. An embodiment having a twofold wavelength dispersive device in the form of two merged prisms will also be presented.

Figure 1:
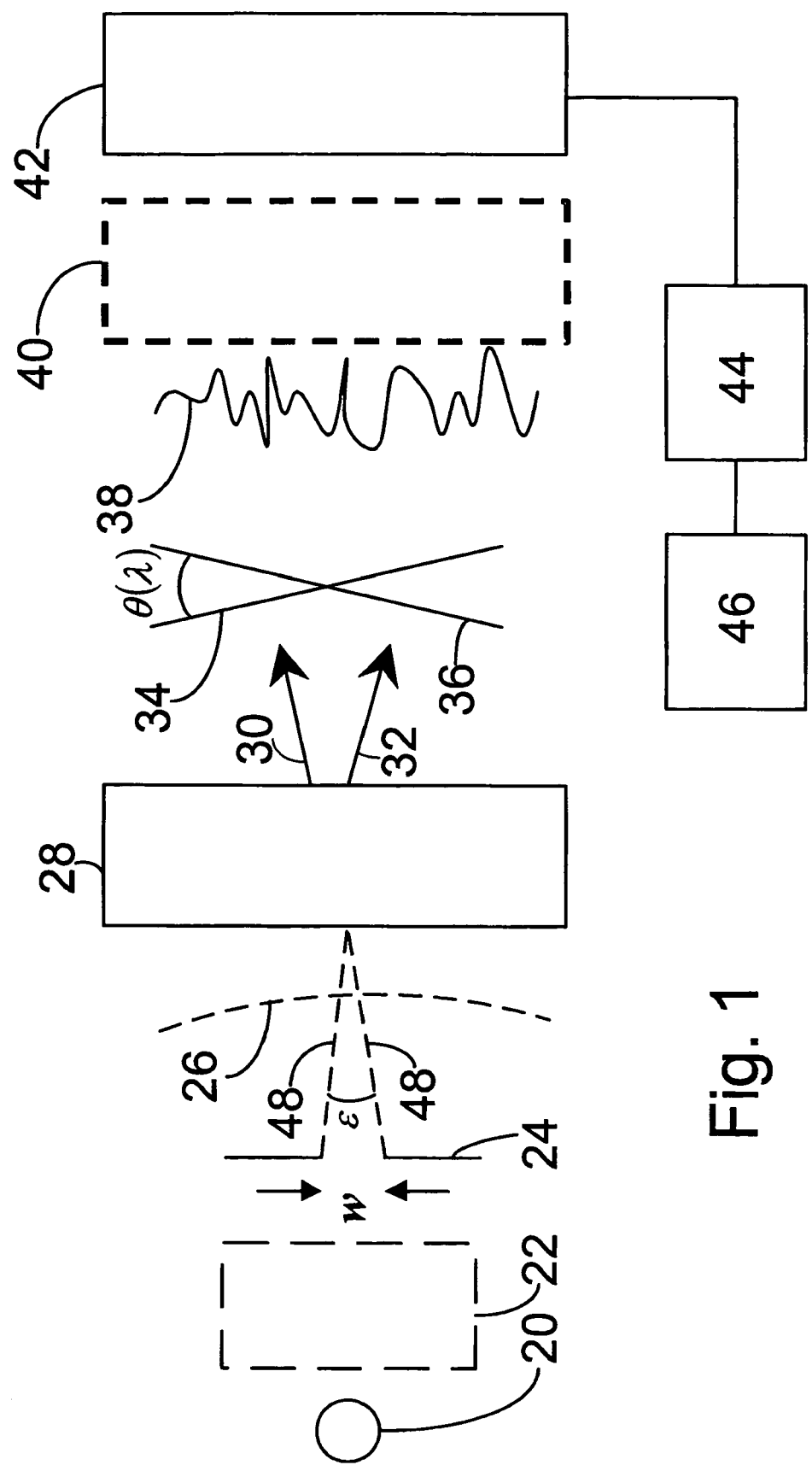
FIG. 1 is a depiction of an arrangement of optical elements of a dispersive Fourier transform spectrometer embodiment of the present invention functioning in a transmission geometry.

FIG. 1 depicts a first embodiment of the optical elements of a dispersive Fourier transform spectrometer of the present invention where input light source 20 and optional input relay optics 22 illuminate aperture 24, which has a diameter w. Subsequent aperture 24, which can also be termed an input port, is input wave 26 propagating towards twofold wavelength dispersive device 28, which is explained in more detail below. As input wave 24 propagates through the twofold wavelength dispersive device 28, i.e. entering dispersive device 28 at an input section and exiting dispersive device 28 at an output section, it is separated into two output beams 30 and 32 propagating generally towards different directions. Wavefronts 34 and 36 of an input beam of wavelength $\lambda$ are shown at wavelength dependent angle $\theta(\lambda)$. Wavefronts 34 and 36 are respectively associated with output beams 30 and 32 and interfere to produce a spatially modulated optical field distribution 38 (also referred to as an interference pattern) which propagates through optional relay optics 40 (e.g., lenses and mirrors) towards read-out device 42 where it is detected. When more than one wavelength is present in the input signal, there will be as many pairs of wavefronts as there are wavelengths. The interference patterns of all the pairs of wavefronts will be included in the optical field distribution 38.

As will be understood by a skilled worker, read-out device 42 can be, for example a linear detector array or a two-dimensional detector array as are known in the art. Read-out device 42 is in communication with processing means 44 (e.g., a computer or a dedicated microprocessor) via an interface means (not shown), which performs a Fourier transform of the signal provided by read-out device 42 to produce, for example, the optical spectrum of input wave 26. A monitor 46, or any other such display device) in communication with processing means 44 and a storage means (not shown) can display the optical spectrum in question.

It is to be noted that in the embodiment of FIG. 1, off-axis rays 48 contribute an error in the angle $\theta(\lambda)$ which propagates as an error in the spatial frequency content of the optical field distribution 38. In this case, the error scales as $Sin^2(\epsilon)$ where $\epsilon$ is the angle between the off-axis rays delimited by aperture 24. This is a great advantage over conventional grating spectrometers where the error scales as $Sin(\epsilon)$.

The input light source 20, optional input relay optics 22, processing means 44 and monitor 46 are common to all the embodiments that will follow. Accordingly, for purposes of clarity of illustration, these common elements will generally not appear in the depictions of subsequent embodiments.

Figure 2B:
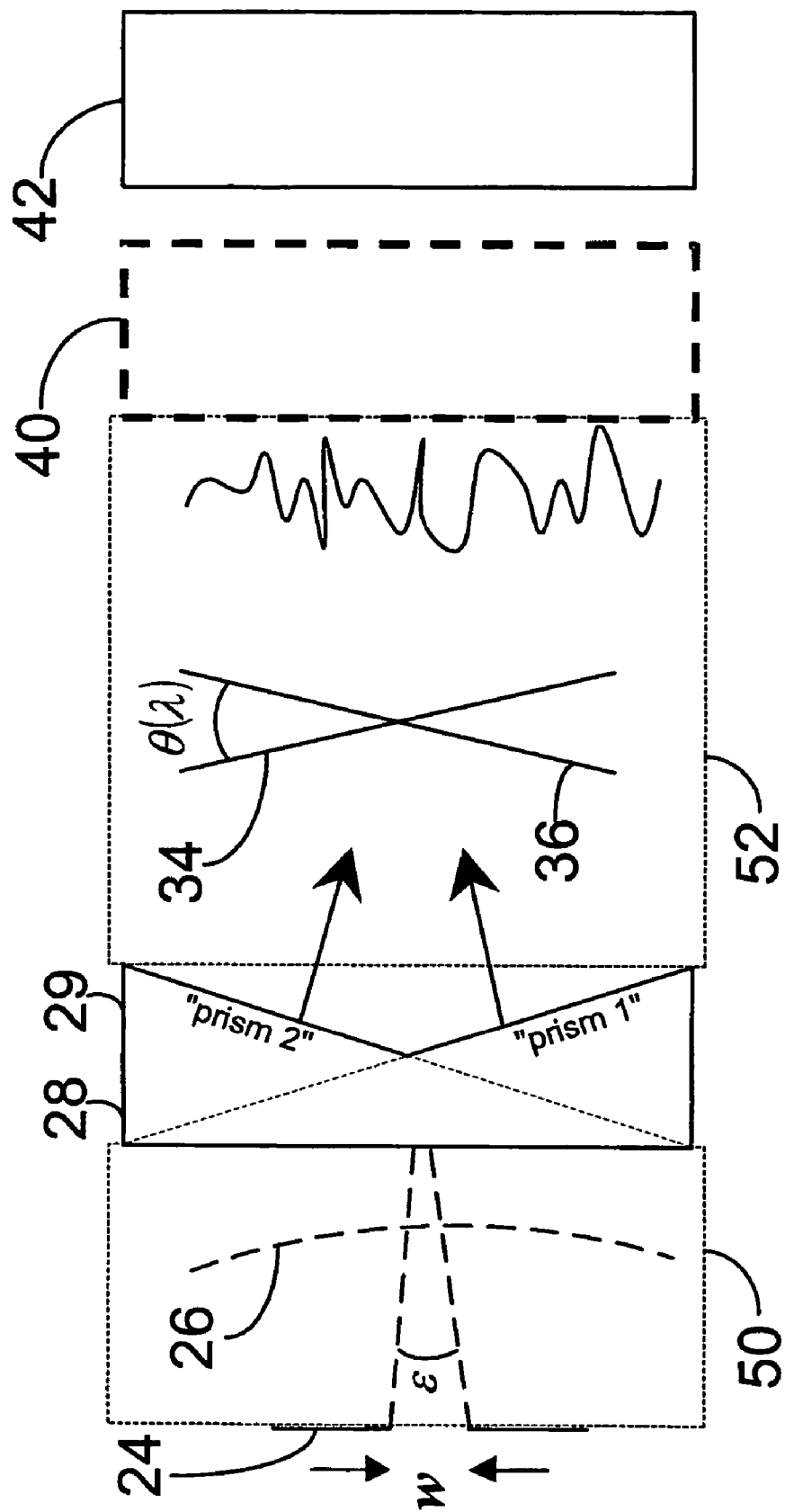
FIG. 2b is depiction of the embodiment of FIG. 2a further including a multi-facet planar element for wavelength dispersion.

FIG. 2a depicts another embodiment of the present invention where the propagation of input wave 26 and wavefronts 34 and 36 occur in planar waveguides 50 and 52 respectively. Planar waveguides are known in the art, and are described, for example, by Govind P. Agrawal in chapter 4 of Lightwave Technology, Wiley, N.Y., 2004. FIG. 2b depicts an embodiment of FIG. 2a where the twofold wavelength dispersive element 28 includes multi-facet planar element 29. Multi-facet element 29 can be conceptualized as the juxtaposition, or the merging, of "prism 1" and "prism 2" as shown in FIG. 2b. Multi-facet element 29, or other types of prism-like elements, can be formed in planar waveguides by using several techniques known in the art. Such techniques include, for example, depositing a dielectric or metallic material over a prism region (also known as the loading effect), creating an opening (window) through the waveguide layers, or in a part thereof, which can be optionally combined with filling the window with one or more advantageously transparent materials having refractive indices different than that of the planar waveguide core.

Figure 3A:
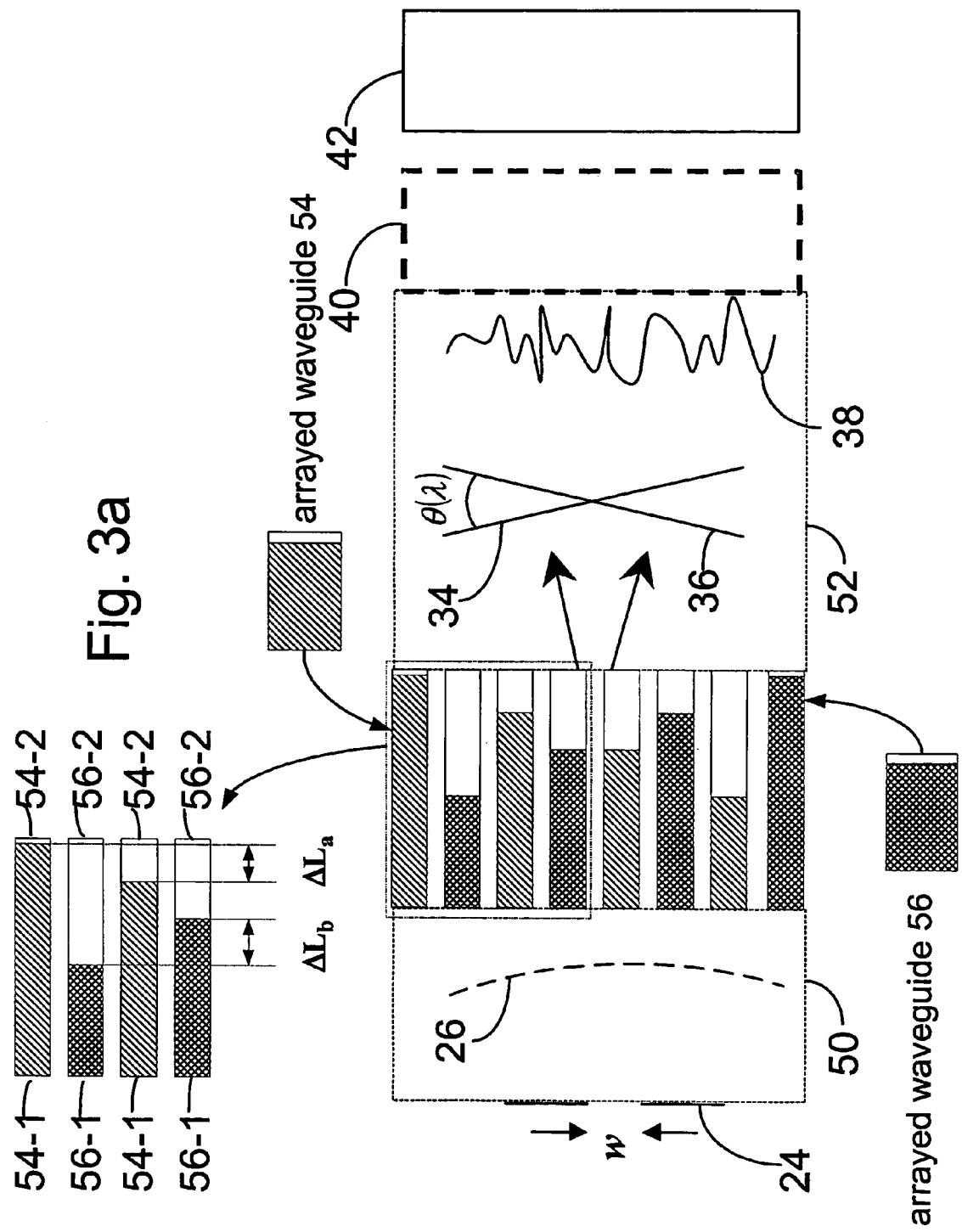
FIG. 3a is a depiction of an embodiment of the present invention with two interleaved arrayed waveguides functioning in a transmission geometry.

FIG. 3a depicts an embodiment of a dispersive Fourier transform spectrometer of the present invention where the twofold wavelength dispersive device 28 of FIG. 1 includes two interleaved arrayed waveguides 54 and 56. The arrayed waveguides 54 and 56 shown in FIG. 3a each have 4 waveguides although any number of waveguides is possible without straying from the intended scope of the present invention. Arrayed waveguides 54 and 56 can have their interference orders differ in magnitude, sign, or both. As shown at the top left of FIG. 3a, arrayed waveguides 54 and 56 have regions 54-1, 54-2 and 56-1, 56-2 respectively. The lengths of the 54-1 sections (or the 56-1 sections) are made such that adjacent 54-1 (56-1) waveguide sections of a same arrayed waveguide differ in length by a value $\Delta L_a$ ($\Delta L_b$). These differences in length can provide wavelength dispersion. Furthermore, regions 54-2 and 56-2 can be optional depending on the given application utilizing the present invention.

Figure 3C:
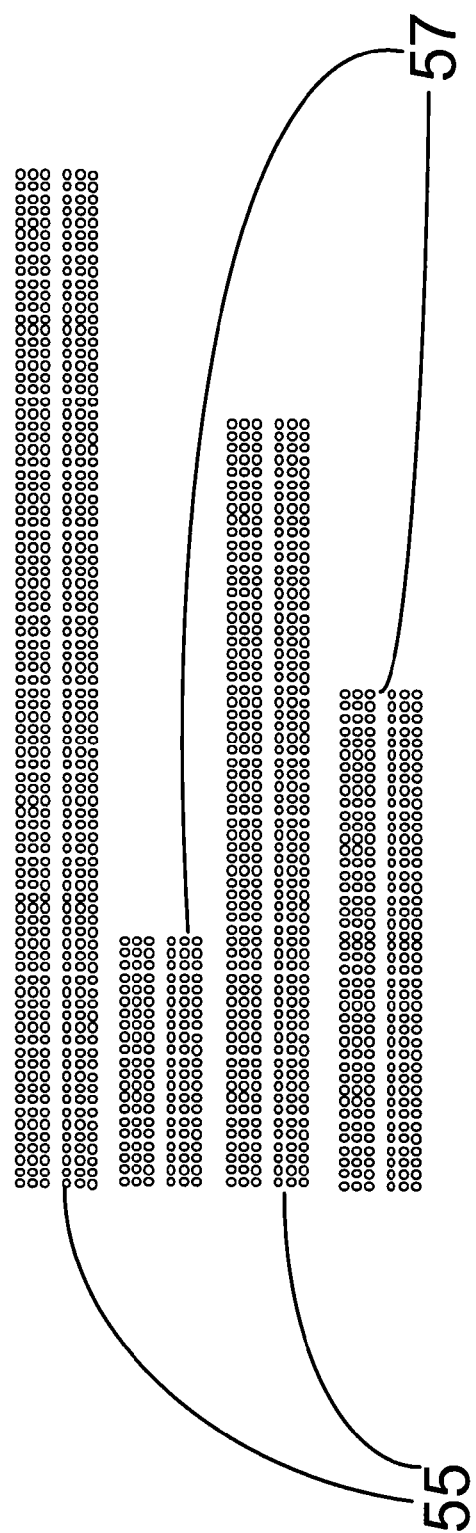
FIG. 3c is a depiction of photonic bandgap waveguides sections.

It can be advantageous to have the group index of sections 54-1 and 56-1 modified by, for example, modifying the widths of these sections, as taught by O.M. Matos et al. in Proc. Optoel 05 Meeting, Pp. 419-434, Alicante, Spain, 13-15 Jul. 2005. The group index modification can be achieved by changing the cross-section dimensions for length segments of the waveguides, or using waveguides of different core and/or cladding materials. Modifying the group index effectively changes the optical path length of individual waveguides. A particularly large group index modification, and hence enhancement of dispersive properties, can be obtained by including in the waveguide array sections of photonic bandgap waveguides, grating structures, or resonators. FIG. 3c shows photonic bandgap waveguide sections that can be formed in corresponding waveguide arrays 55 and 57; FIG. 3d shows waveguide arrays 59 and 61 having prating structures formed therein: and FIG. 3d shows waveguide arrays 63 and 65 having resonators formed therein.

It can be shown that an enhancement of dispersion due to group index modification can be expressed in terms of a modified interference order M as follows:

$$M = M_{conv} + M_{group} \sim M_{conv} + \frac{\Delta n_{group} \Delta L}{\lambda} \quad \text{Equation (1)}$$

where $M_{conv}$ is the interference order in a conventional arrayed waveguide grating device and $M_{group}$ is the interference order enhancement due to the waveguide group index modification $\Delta n_{group}$. $\lambda$ is the wavelength of light, and $\Delta L$ is the difference in length of adjacent sections with a modified group index. The interference order $M_{conv}$ of a conventional arrayed waveguide device is well known in the art and can be expressed, for example, as equation 1 of M. K. Smith et al., IEEE J. Sel. Top. Quant. Electr. Vol 2, pp. 236-250, 1996.

An advantage of the transmission geometry shown in FIGS. 2a, 2b and 3a is that the input aperture 24 and the read-out device are in two different planar waveguide regions hence avoiding vignetting. In such cases, relay optics 40 are not necessarily required for read-out of optical field distribution 38.

Advantageously, the waveguides of the arrayed waveguides 54 and 56 can be coupled or joined together, for example by using y-coupling as shown in FIG. 3b, before they reach planar waveguide 52. This reduces the separation between the waveguides in the region where arrayed waveguides 54 and 56 reach planar waveguide 52. As will be understood by a worker skilled in the art, this in turn results in a suppression of higher diffraction orders in the planar waveguide 52.

Figure 4:
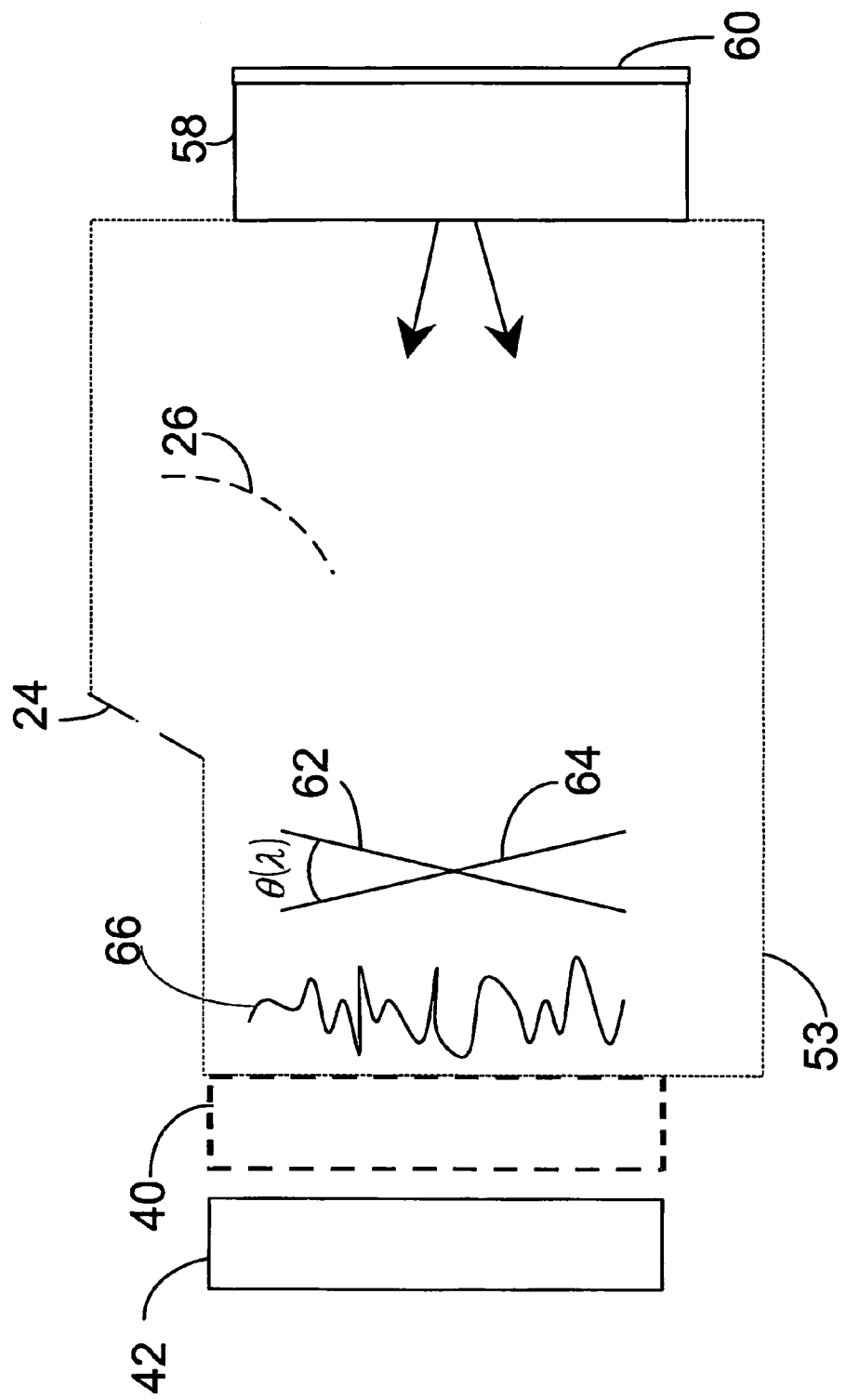
FIG. 4 is a depiction of an arrangement of optical elements of a dispersive Fourier transform spectrometer embodiment of the present invention functioning in a reflection geometry.

FIG. 4 depicts an embodiment of the optical elements of a dispersive Fourier transform spectrometer of the present invention operating in a reflection geometry. There, input wave 26 stemming from aperture 24 propagates in planar waveguide 53 towards twofold wavelength dispersive device 58 which includes an input section at the border region between planar waveguide 53 and dispersive device 58, and is terminated at one end, also referred to as a reflecting section by reflector 60 or other reflecting means as are known in the art. The twofold wavelength dispersive device 58 includes two interleaved dispersive components, also referred to as interleaved wavelength dispersive devices. Input wave 26 transmits through dispersive element 58 and is reflected by reflector 60. The reflected signal again transmits through twofold wavelength dispersive device 58. Upon exiting twofold wavelength dispersive device 58, the optical signal for a wavelength $\lambda$ includes two wavefronts 62 and 64 with a wavelength dependent angle $\theta(\lambda)$ between them. A spatially modulated optical field distribution 66 carrying information about the input wave 26 is formed by wavefronts 62 and 64. Such optical field distribution 66 subsequently traverses optional relay optics 40 and is detected by read-out device 42.

Figure 5:
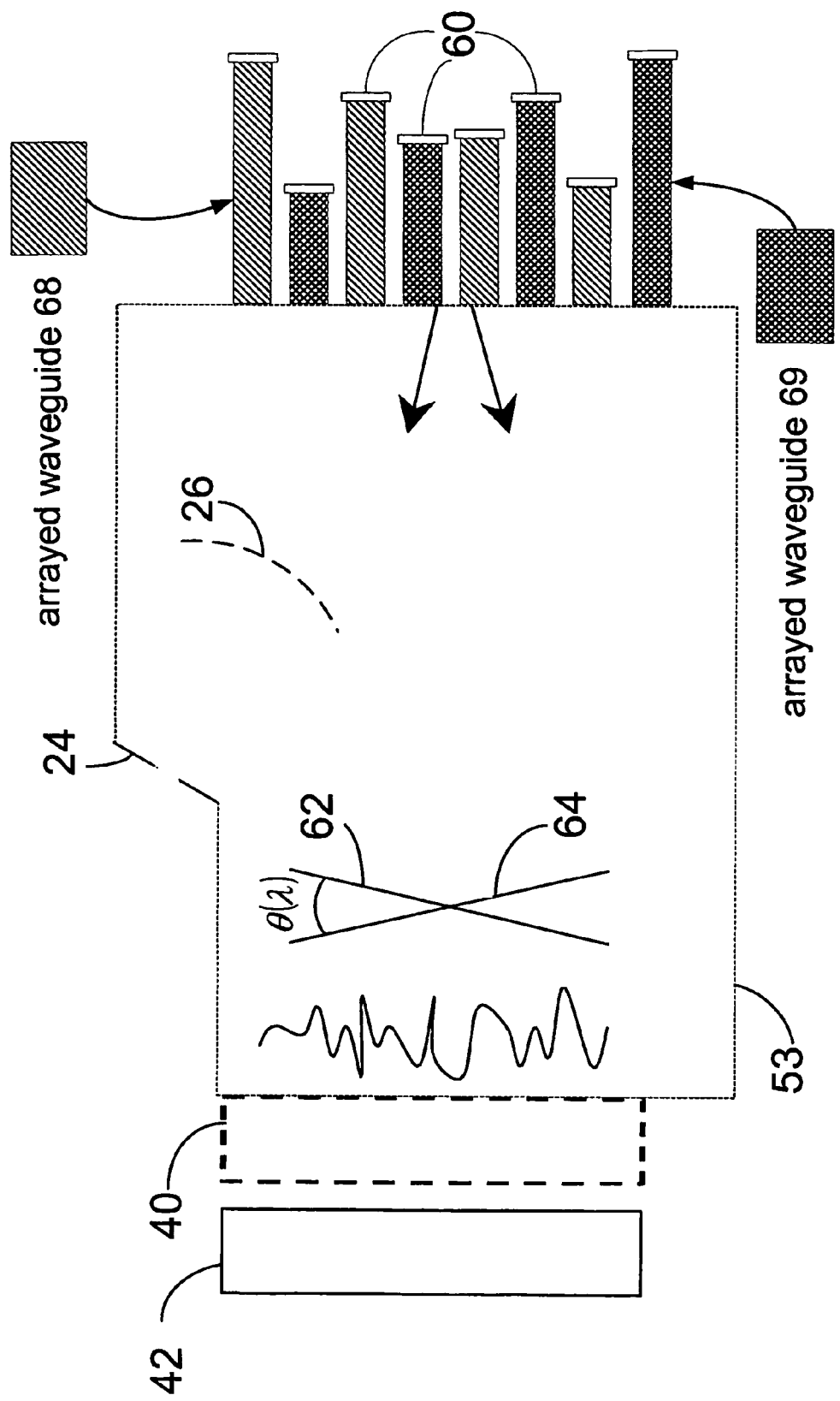
FIG. 5 is a depiction of the embodiment of FIG. 4 with two interleaved arrayed waveguides functioning in a reflection geometry.

FIG. 5 depicts a particular embodiment of the dispersive Fourier transform spectrometer shown in FIG. 4. Here, the twofold wavelength dispersive device includes two interleaved truncated arrayed waveguides 68 and 69 with different wavelength dispersion properties, the arrayed waveguides being terminated with reflectors 60. The interleaved arrayed waveguide 68 and 69 can have their interference orders differ in magnitude, sign, or both. Advantageously, and as mentioned in relation to FIG. 3a, varying waveguide lengths, typically with a linear increment, provides wavelength dispersion. Also as mentioned in relation to FIG. 3a, the dispersion can be enhanced by waveguides having sections with a modified group index. Similarly to what is depicted in FIG. 3b, the waveguides of the arrayed waveguides 68 and 69 can be coupled or joined together, for example by using y-coupling, before they reach planar waveguide 53. This reduces the separation between the waveguides in the region where arrayed waveguides 68 and 69 reach planar waveguide 53. As will be understood by a worker skilled in the art, this in turn results in a suppression of higher diffraction orders in the planar waveguide 53.

Figure 6A:
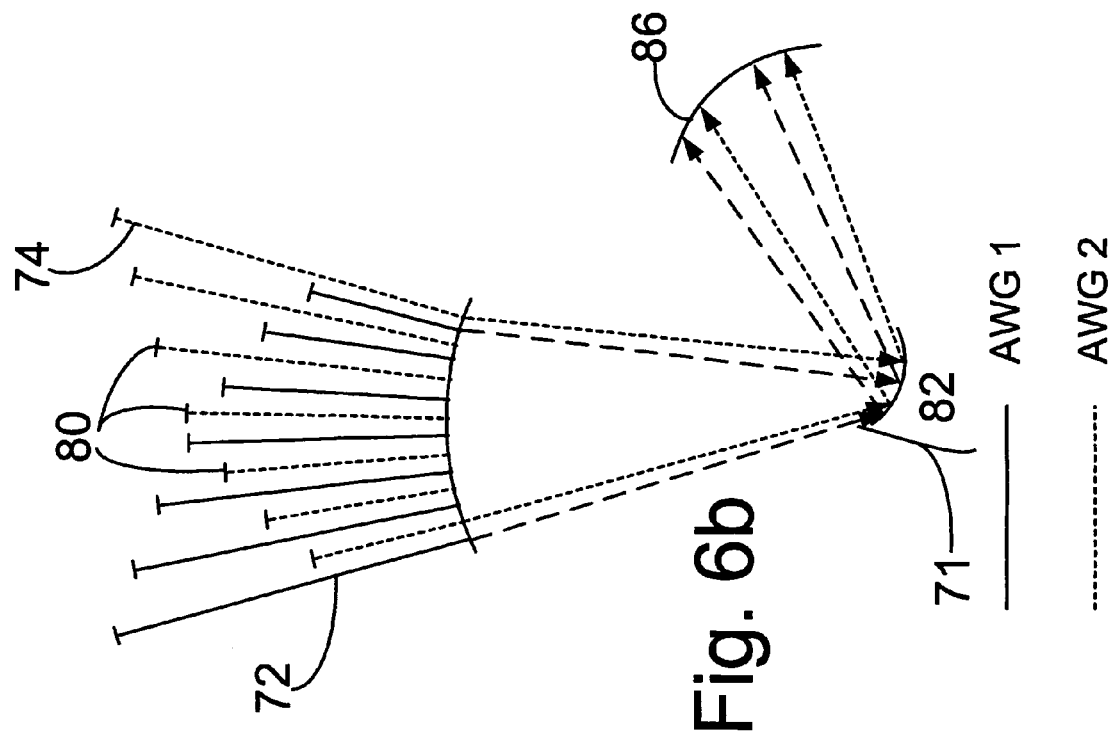
FIGS. 6a and 6b are depictions of the embodiment of FIG. 4 with two interleaved arrayed waveguides with each input end of individual waveguides disposed on an arc of circle and with an off-axis reflector for illuminating a read-out device.
Figure 6B:
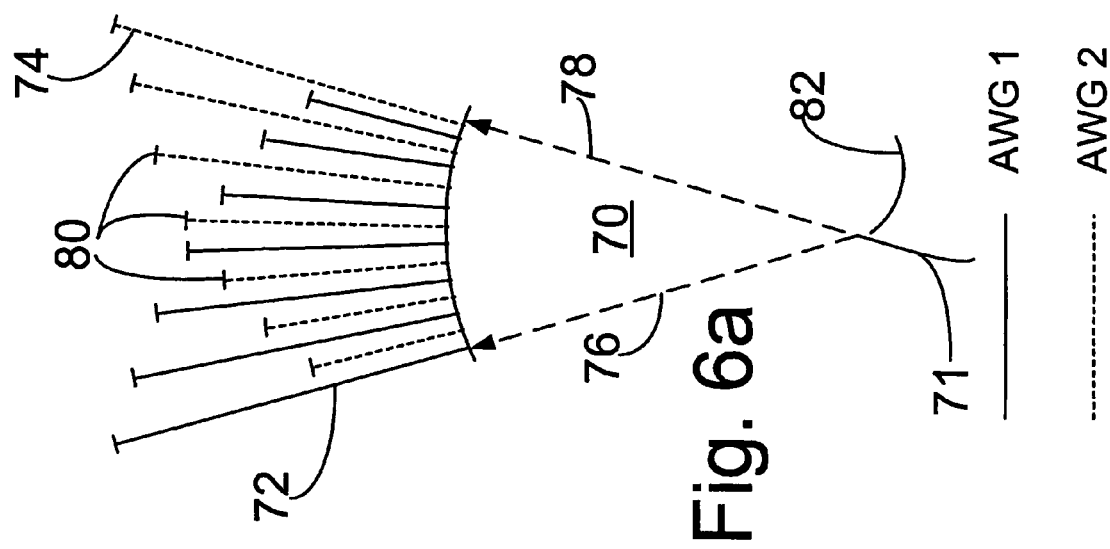
Figure 6E:
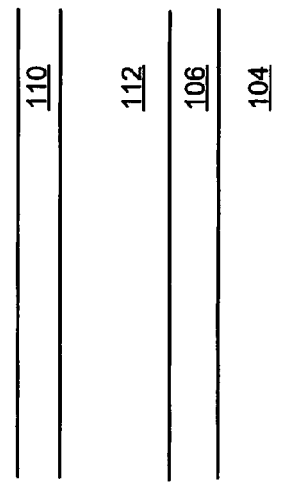
FIGS. 6c, 6d and 6e are top and cross-sectional views of an input waveguide adjoining a planar waveguide.
Figure 6C:
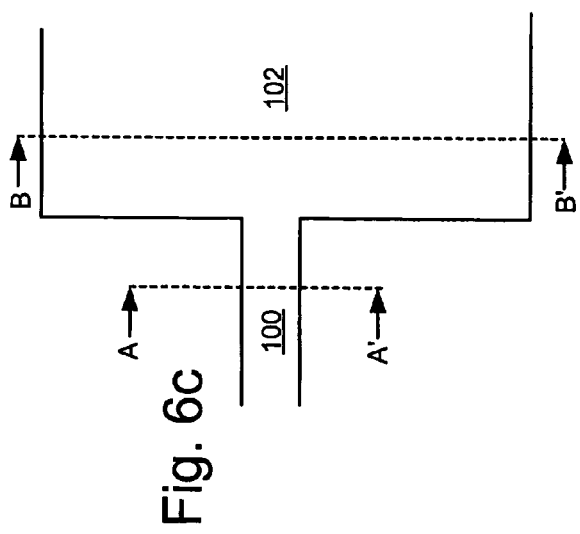
Figure 6D:
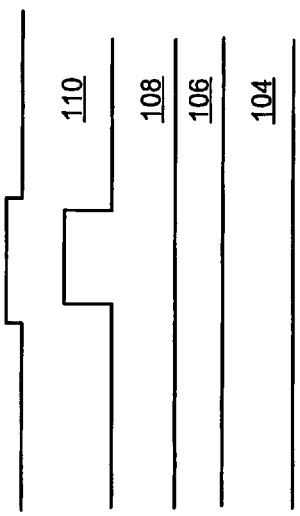

FIGS. 6a and 6b depict another particular embodiment of the dispersive Fourier transform spectrometer shown in FIG. 4. An input waveguide 71 of aperture width w illuminates planar waveguide 70. As known by a worker skilled in the art, the input waveguide 71 can include any cross-section and be, for example, a buried waveguide, a raised waveguide, a loaded waveguide, a ridged waveguide, a striped waveguide or a rib-type waveguide. Furthermore, input waveguide 71 can include tapered sections to adjust its width as required by a particular spectrometer design. FIGS. 6c to 6e show top and cross-sectional views of an input ridge waveguide joining a planar slab waveguide. FIG. 6c shows input waveguide 100 adjoining planar waveguide 102. FIG. 6d shows a cross-sectional view along the line A-A', where substrate 104, bottom cladding 106, input ridge waveguide core 108 and optional upper cladding 110 are depicted. FIG. 6E shows a cross-sectional view of planar waveguide 102 along the line B-B', where substrate 104, bottom cladding 106, planar waveguide core 112 and optional upper cladding 110 are depicted. As mentioned above, different technologies can be used to fabricate such waveguide structures. Input waveguide 68 can be optional as the input aperture may be located directly at the edge of the slab waveguide.

Figure 7:
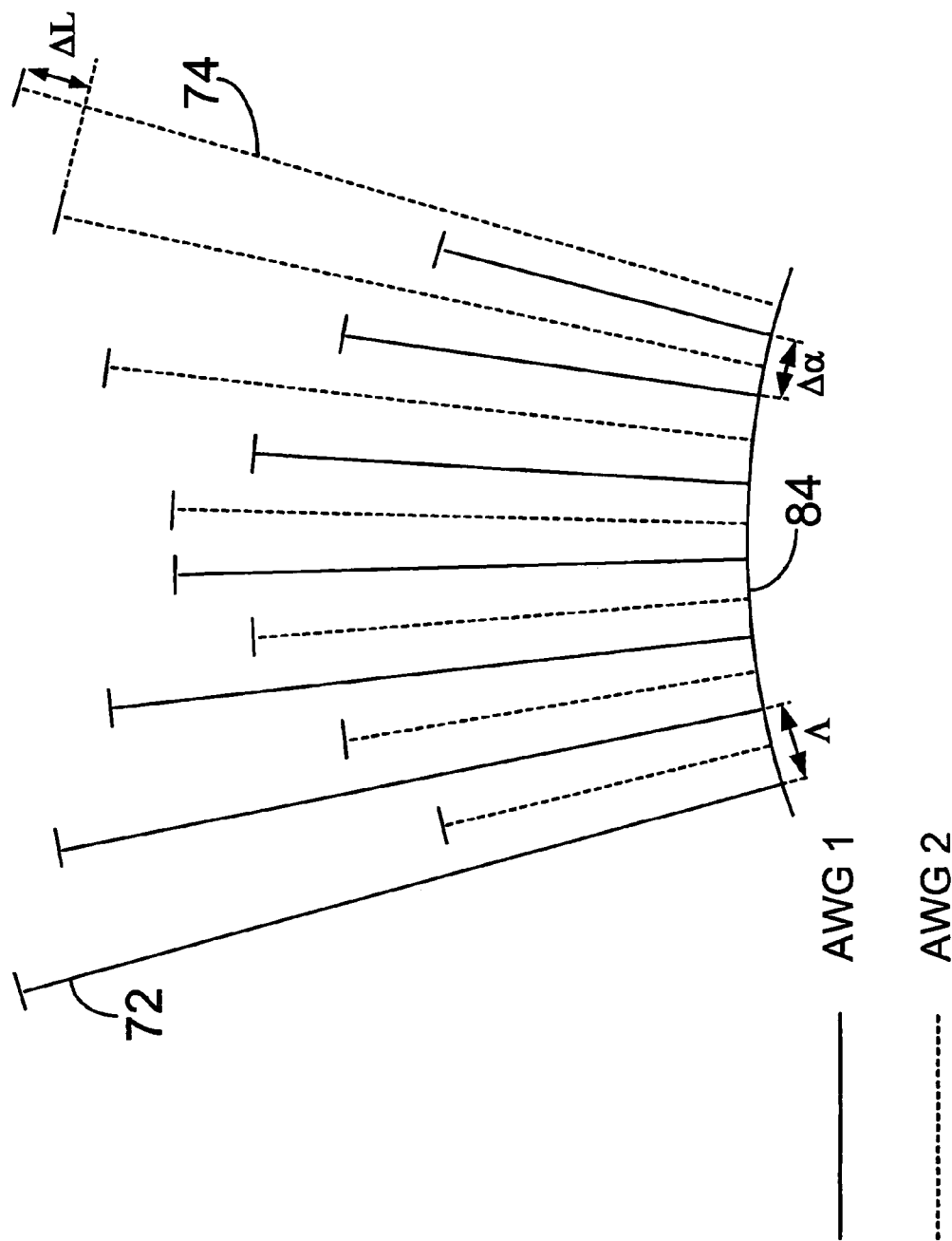
FIG. 7 is a depiction of the pitch, angle and length increment between individual waveguides of the embodiment of FIGS. 6a and 6b.

As shown in FIGS. 6a, 6b and 7, light stemming from input waveguide 71 illuminates interleaved arrayed waveguides 72 (AWG 1) and 74 (AWG 2) in an angle lying between rays 76 and 78. Arrayed waveguides 72 and 74 are formed to have interference orders $m_1$ and $m_2$ respectively and each arrayed waveguide includes lengths of individual waveguides having a reflector 80 at their end. Light traversing planar waveguide 70 is coupled in arrayed waveguides 72 and 74, propagates along the lengths of the individual waveguides making up the arrayed waveguides and is reflected back out of the waveguides by reflectors 80. The light output from arrayed waveguides 72 and 74 then propagates again through planar waveguide 70 towards off-axis mirror 82, which can include a waveguide mirror. Alternatively, the illumination of planar waveguide 70 can also be achieved with light input means other than waveguiding means such as input waveguide 71.

It can be appreciated that by interleaving arrayed waveguides 72 and 74, beam-splitting and combining are achieved, thus obviating the need for dedicated beam-splitter and combiner elements.

It is advantageous to choose a constant length difference ΔL between adjacent lengths of waveguides of a same arrayed waveguide as shown in FIG. 7 in relation to arrayed waveguide 74 (AWG 2). For a given arrayed waveguide, the length difference can be chosen to be $\Delta L = m\lambda_d/(2n_{eff})$, where $\lambda_d$ is the designed free space wavelength for which the phase difference between adjacent lengths of waveguides in the given arrayed waveguide is $\Delta\phi = 2\pi m$. The values m and $n_{eff}$ are respectively the order of the given arrayed waveguide and the effective index of the fundamental waveguide mode.

As the wavelength changes from the Littrow wavelength, the Littrow wavelength being the wavelength at which the two wavefronts emerging from arrayed waveguides 72 and 74 are parallel, the two wavefronts tilt with respect to each other in planar waveguide 70, thereby forming an angle θ(λ). According to the known arrayed waveguide angular dispersion relation (see e.g. M. K. Smith and C. van Dam, IEEE J. Sel. Top. Quant. Electr. Vol 2, pp. 236-250, 1996), the rate of change of the angle θ(λ) with respect to wavelength is given by:

$$\frac{d\theta}{d\lambda} = \frac{d\theta_2 - d\theta_1}{d\lambda} = \frac{n_g(\Delta L_2 - \Delta L_1)}{f\lambda_d n_s \Delta\alpha} = \frac{m_2 - m_1}{n_s \Lambda}, \quad \text{Equation (2)}$$

where Δα and Λ are respectively the divergence angle and the pitch of the waveguide array as shown in FIG. 7. Furthermore, f is the focal length of the interleaved dispersive device formed by arrayed waveguides 72 and 74. This focal length is in fact equal to the radius of curvature of arc 84 shown in FIG. 7. Arc 84 is defined by the line along which the reflector-free ends of the lengths of waveguides of arrayed waveguides 72 and 74 lie and $n_s$ is the effective mode index of planar waveguide 70, and $n_g$ is the group index of the array waveguide fundamental mode.

In the case where the interference orders of arrayed waveguides 72 and 74 are different, the wavefronts stemming from arrayed waveguides 72 and 74 yield a spatial light intensity modulation having a wavelength dependent period d(λ). For example, for two arrayed waveguides differing solely in the sign of their interference order m (e.g., arrayed wave guide 72 has an interference order m while arrayed waveguide 74 has an interference order −m), equation (2) yields $d\theta/d\lambda = 2m/(n_s\Lambda)$. A real image of the light intensity modulation along the object plane (i.e., located near arc 84) can be formed by off-axis mirror 82 along the image curve 86 as shown in FIG. 6b. As is known in the art, a read-out device can be disposed along curve 86 to detect the image.

The reflectors 80 can be formed, for example, by a metallized trench etched vertically through the waveguiding layers. The read-out device can be an array of waveguides, photodetectors, gratings, couplers, waveguide mirrors, and other known optical sampling elements. As mentioned in relation to FIG. 3b, adjacent lengths of waveguides of arrayed waveguides 72 and 74 can be advantageously coupled or joined together before they reach arc 84.

Figure 8:
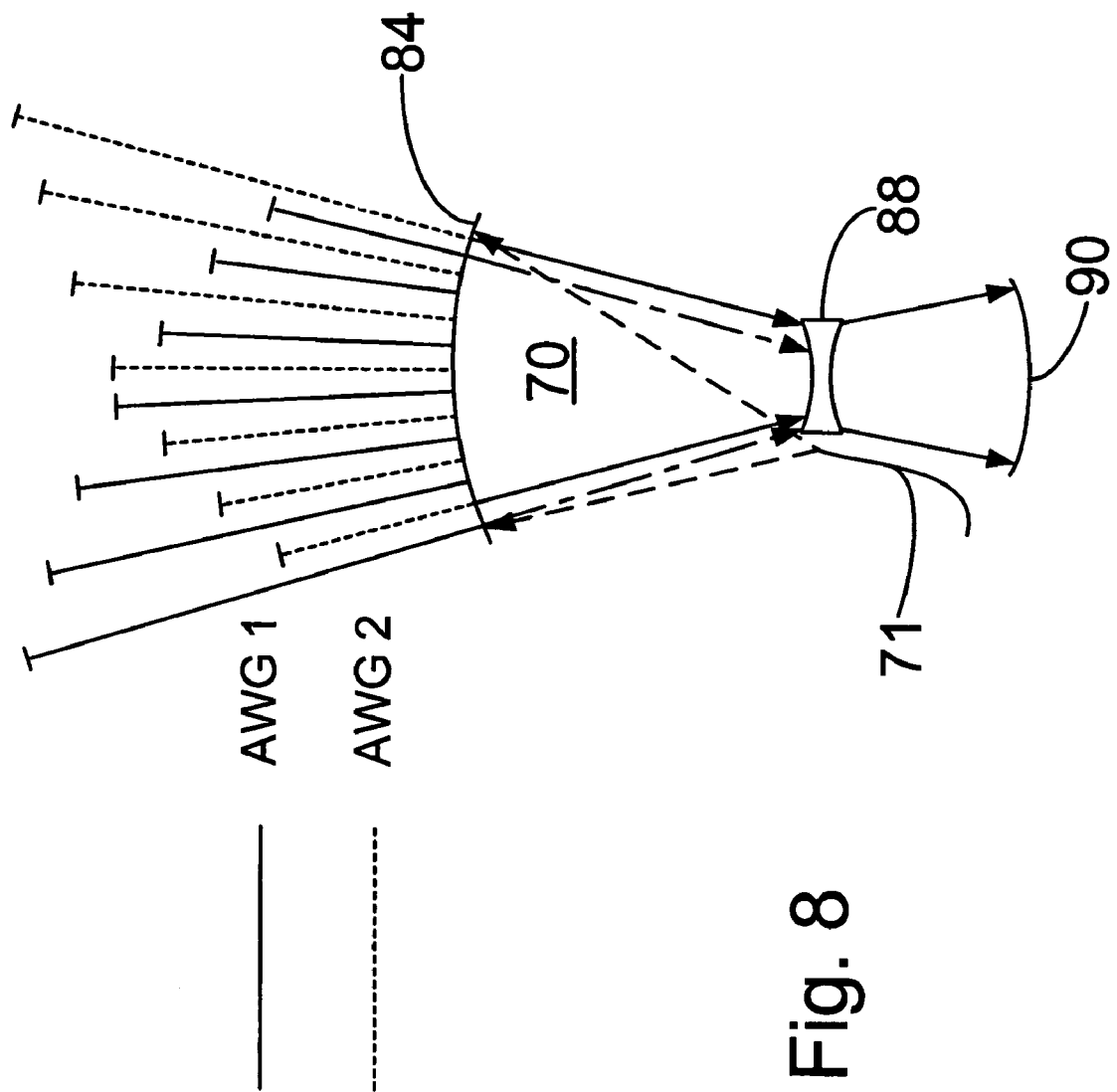
FIG. 8 is a depiction of an embodiment of FIG. 4 with two interleaved arrayed waveguides with each input end of individual waveguides disposed on an arc of circle and with lens for illuminating a read-out device.

FIG. 8 depicts another particular embodiment of the dispersive Fourier transform spectrometer shown in FIG. 4. However, in FIG. 8, a waveguide lens 88 (or other lens means as are known in the art) is provided in lieu of off-axis mirror 82. Such waveguide lens 88 can be a single or a multiple element lens formed by modifying the refractive index of a part of waveguide layers or by substituting a part of the waveguide layers by a material with a different refractive index, as is known in the art. The image formed by waveguide lens 88 can be detected by a read-out device disposed along image curve 90. As in previous embodiments, adjacent lengths of waveguides of arrayed waveguides 72 and 74 can be advantageously coupled or joined together before they reach arc 84.

The embodiment of FIG. 8 has been modeled assuming a silicon-on-insulator (SOI) waveguide platforms with a 2 μm thick silicon waveguide core. A first of the two interleaved arrayed waveguides has an interference order m=41 while the other has m=−41. Each arrayed waveguide has N=255 waveguides (hence total 510 interleaved waveguides) with a constant length increment of ΔL=8.6 μm and a waveguide pitch Λ=7.8 μm. This corresponds to a theoretical diffraction limited resolving power of R=20,910 and a wavelength resolution of Δλ~0.07 nm at a Littrow wavelength of 1500 nm. Furthermore, the length of the planar waveguide is f=4 mm, which is also equal to the radius of curvature of arc 84 (FIG. 7). Input waveguide 71 of FIG. 8 is modeled as a waveguide lens doublet of $Si_3N_4$ of refractive index n~2 embedded in a Si planar waveguide. The field distribution (interferogram) formed by the wavefronts emerging from the arrayed waveguides is spatially sampled at 960 points along image curve 86 by sampling waveguides spaced at a pitch of 2 μm. Results of simulations appear in FIGS. 9a, 9b, 10a and 10b.

FIG. 9a shows the simulated interferogram for an extended incoherent source formed by a waveguide having an aperture width w=40 μm and a focal length f=4 mm. The optical spectrum of FIG. 9b was obtained by Fourier transformation of the interferogram of FIG. 9a. The incoherent light source comprises four monochromatic lines at wavelengths of 1503 nm, 1510 nm, 1510.1 nm, and 1515 nm.

FIG. 10a shows the simulated interferogram and FIG. 10b the calculated spectra for a light source comprising the wavelengths 1510, 1520, 1520.3, 1530, 1540, and 1550 nm. The spectra shown in FIGS. 9b and 10b demonstrate very good resolution in that wavelength peaks separated by as little as 0.1 nm are well resolved for this large waveguide aperture. This is a remarkable increase in the aperture size compared to grating based micro-spectrometers, which would require, for a similar resolution and interference order, an input waveguide width of about 1 μm. Thus, the dispersive Fourier transform spectrometer of the present invention can be used particularly advantageously in the spectral analysis of light from large, diffuse and non-collimated sources or, for improving the spectrometer étendue particularly when the light sources are weak.

The possibility of achieving high spectral resolution and at the same time a large étendue is an obvious advantage of this invention. In the examples above, the spectral resolution is ~0.07 nm. To achieve this resolution in a conventional FT spectrometer with scanning mirror would require a mirror scanning range of approximately 10 mm. It is highly improbable to make mirrors with such a large scanning range with the current state of MEMS.

The following considerations on interferogram interpretation, spectral resolution, and bandwidth apply to the present invention. Monochromatic light of wavelength λ produces in a planar waveguide, after passing through a twofold wavelength dispersive device, a sinusoidal intensity modulation (interference fringes) having a period d(λ)

$$d(\lambda) = \frac{\lambda}{2n\sin[\theta(\lambda)/2]} \quad \text{Equation (3)}$$

while for an arbitrary input spectral density B(λ) the light intensity as a function of position x along the interference pattern is given by $$I(x) = \int_0^\infty B(\lambda)\left[1 + \cos\frac{2\pi}{d(\lambda)}x\right]d\lambda. \quad \text{Equation (4)}$$

Once $I(x)$ is measured, the light spectrum B(λ) can be retrieved by Fourier transformation of the measured interferogram. As it is explained in different embodiments of this invention, the interferogram (light fringes) can be read out directly in the planar waveguide section or relay optics can be used to form the real image of the fringes along an image curve.

Higher diffraction orders of an interleaved arrayed waveguide dispersive element (e.g., the twofold wavelength dispersive device 28 of FIG. 1) can produce spurious field modulation. This can be controlled by different techniques taken either alone or in combination with each other. For example, it is possible to suppress higher diffraction orders by reducing the array waveguide pitch Λ as explained above. Higher diffraction orders can also be suppressed by using waveguides having a lower refractive index, such as, for example glass, polymers, silicon-oxynitride, and others known in the art. This effectively increases the wavelength of light inside the waveguide. Alternatively, it is possible to use a non-diffractive wavelength dispersive element (for example a waveguide prism) or to sample the field intensity further away from the dispersive element thereby reducing the spatial overlap between the fundamental and the higher orders of diffraction. It is also possible to address this issue by digitally filtering the spurious features from the spectral data, or when possible, to shift the spectrometer's operational bandwidth to longer wavelengths. Yet another technique involves utilization of relay optics having a limited numerical aperture such that the higher orders do not reach the relay optics.

The spectral resolution of a dispersive Fourier transform spectrometer or device can be estimated as the variation in wavelength Δλ producing a variation Δθ in the angle between the two interfering wavefronts that results in one extra fringe (total n+1 fringes) of the interferogram along an image curve of length D. This can be expressed as $$n+1 = 2\frac{n_s D}{\lambda + \Delta\lambda}\sin\frac{\theta + \Delta\theta}{2}. \quad \text{Equation (5)}$$

From equations 2 and 5, assuming a small angle approximation and Δλ<<λ, it can be showed that the resolving power is given by R=λ/Δλ=2 mN, where N is the number of the waveguides in a single arrayed waveguide. As the total number of arrayed waveguides in the interleaved device is 2 N, the well-known formula for the resolving power of a grating device is obtained.

The maximum wavelength bandwidth (Γ) within the free spectral range can be estimated from the number of sampling points along the interference pattern. For example, by using a read-out device having N elements (for example a detector array with N illuminated pixels, or N sampling waveguides) according to the sampling theorem the maximum number of resolved fringes is $$n_{max} = N/2 \sim 2n_s D(\lambda_L + \Gamma)^{-1}\sin\{[\theta(\lambda_L + \Gamma)/2]\} \quad \text{Equation (6)}$$

Using Eq. 1, for the bandwidth we obtain $$\Gamma \sim 4n_s DN^{-1}\sin[m\Gamma/(n_s\Lambda)] - \lambda_L \quad \text{Equation (7)}$$

from where Γ can be found numerically. For small bandwidths, $$\Gamma \sim \lambda_L N\Lambda/(4mD - N\Lambda) \quad \text{Equation (8)}$$

As will be understood by a worker skilled in the art, the present invention allows not only to analyse an optical signal including multiple wavelengths, but also to combine pairs of optical signals, each member of the pair having the same wavelength, each pair having a different wavelength into a single optical signal. This is achieved by illuminating the twofold wavelength dispersive element in a direction reversed to the direction disclosed herein.

The invention, together with the above embodiments of the invention, provides a method and a spectrometer for the spectral analysis of an optical signal directed to a wavelength dispersive component formed by two interleaved dispersive devices. For a single wavelength, the optical signal exiting the interleaved dispersive devices includes two wavefronts generally at an angle to one another and producing an interference pattern. The interference pattern is detected and subsequently analyzed via a Fourier transform to produce the optical spectrum of the input optical signal.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A spectrometer for analyzing an optical signal, the spectrometer comprising:
   an input port for receiving the optical signal; and
   two interleaved wavelength dispersive devices for receiving the optical signal from the input port and for dispersing the optical signal.

2. The spectrometer of claim 1, wherein the two interleaved dispersive devices each produce a dispersed signal having a wavefront.

3. The spectrometer as claimed in claim 1 further comprising a first planar waveguide for coupling the optical signal from the input port to the two interleaved wavelength dispersive devices.

4. The spectrometer of claim 1, wherein each dispersive device includes distinct input and output sections.

5. The spectrometer of claim 4 further comprising:
   a read-out device;
   a first planar waveguide for coupling the optical signal from the input port to the input section of each dispersive device; and
   a second planar waveguide for coupling light from each output section of each dispersive device to the read-out device.

6. The spectrometer of claim 1, wherein each dispersive device includes an input section and a reflecting section.

7. The spectrometer of claim 6 further comprising:
   a read-out device; and
   a planar waveguide for coupling the optical signal from the input port to the input section of each dispersive device and for coupling dispersed reflected light reflected from the reflecting section back to the input section, from the input section of each dispersive device to the read-out device.

8. The spectrometer of claim 1, wherein each dispersive device includes a waveguide array.

9. The spectrometer of claim 8, wherein each waveguide array includes individual waveguides where adjacent individual waveguides of a same waveguide array have differing lengths relative to one another.

10. The spectrometer of claim 9, wherein an individual waveguide from a first waveguide array is y-coupled to an adjacent individual waveguide from a second waveguide array.

11. The spectrometer of claim 8, wherein each waveguide array includes individual waveguides where adjacent individual waveguides of a same waveguide array have differing optical path lengths relative to one another.

12. The spectrometer of claim 11, wherein the adjacent individual waveguides include at least one of a photonic bandgap section, a grating section, and a resonator section.

13. The spectrometer of claim 8, wherein at least one waveguide array includes individual waveguides, adjacent individual waveguides each having a section with a modified group index, the sections with a modified group index of the adjacent individual waveguides differing in length by a value $\Delta L$, and having a modified group index $\Delta n_{group}$ at a wavelength $\lambda$ resulting in the at least one waveguide array having an interference order M at a wavelength $\lambda$ expressible as $$M \sim M_{conv} + \frac{\Delta n_{group} \Delta L}{\lambda},$$

$M_{conv}$ being the waveguide array interference order in an absence of a group index modification.

14. The spectrometer of claim 13, wherein the modified group index $\Delta n_{group}$ depends on the presence of at least one of a photonic bandgap section, a grating section, and a resonator section being present in the individual waveguides.

15. The spectrometer of claim 8, wherein each waveguide array includes individual waveguides each having an input section and a reflection section, the input sections of the individual waveguides substantially forming an arc of circle.

16. The spectrometer of claim 15, wherein adjacent individual waveguides from a same waveguide array are separated by a substantially same pitch.

17. The spectrometer of claim 15 further comprising:
   a read-out device;
   a reflecting means; and
   a planar waveguide for coupling the optical signal from the input port to the input section of each waveguide array and for coupling reflected dispersed light from the input section of each waveguide array to the reflecting means, the reflecting means for directing reflected dispersed light to the read-out device.

18. The spectrometer of claim 15 further comprising:
   a read-out device;
   a lens; and
   a planar waveguide for coupling the optical signal from the input port to the input section of each waveguide array and for coupling reflected dispersed light from the input section of each waveguide array to the lens, the lens for directing reflected dispersed light to the read-out device.

19. The spectrometer of claim 1, wherein the input port includes an optical waveguide.

20. The spectrometer of claim 1, wherein the input port and the two interleaved wavelength dispersive devices are part of a monolithic opto-electronic device.

21. The spectrometer of claim 2 further comprising:
   a read-out device;
   a processing means; and
   an interface means for interfacing between the read-out device and the processing means, the read-out device for detecting an interference pattern signal generated by the wavefronts, the processing means for analyzing the interference pattern signal.

22. A method of determining the spectrum of an optical signal, the method comprising steps of:
   illuminating two interleaved dispersive devices;
   detecting a dispersed light signal from the interleaved dispersive devices;
   analyzing the dispersed light signal, the step of analyzing the dispersed light signal including performing a Fourier transform of the dispersed light signal; and
   using results obtained from performing the Fourier transform to obtain the spectrum of the optical signal.

* * * * *